Dec. 4, 1956  H. E. RICKS ET AL  2,773,025
DESTROYING CYANIDES IN AQUEOUS CYANIDE SOLUTIONS
Filed Sept. 10, 1953
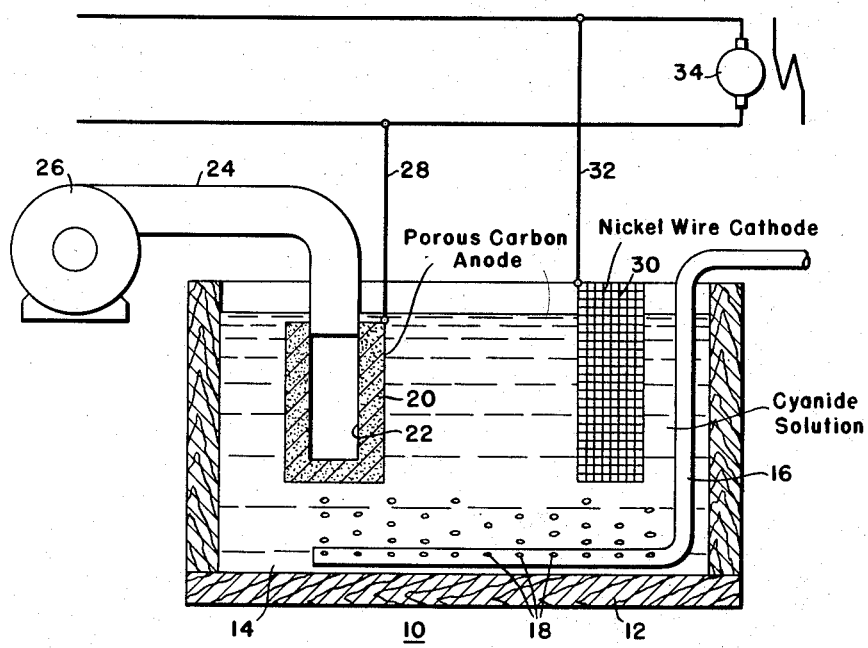
WITNESSES
INVENTORS
Herbert E. Ricks &
Warren M. Trigg
BY
ATTORNEY _United States Patent Office_

2,773,025
Patented Dec. 4, 1956

2,773,025

DESTROYING CYANIDES IN AQUEOUS CYANIDE SOLUTIONS

Herbert E. Ricks and Warren M. Trigg, Pittsburgh, Pa., assignors to Westinghouse Electric Corporation, East Pittsburgh, Pa., a corporation of Pennsylvania Application September 10, 1953, Serial No. 379,442

4 Claims. (Cl. 204—149)

The present invention relates to the treatment of aqueous solutions containing a cyanide in order to rapidly reduce the cyanide content to an extremely low concentration.

This application is a continuation-in-part of application Serial No. 234,756, filed July 2, 1951 now abandoned.

It has been a difficult problem in the plating industry, for example, to dispose of waste electrolytes, rinse waters, and other solutions containing cyanides. The dye industry and other chemical industries also have the problem of disposal of solutions containing cyanides. Because of the high toxicity of cyanides, these waste solutions cannot be discarded into the sewer and some treatment is necessary to reduce the cyanide content to a minimum of a few parts per million of the solution.

The problem of disposing of cyanide rinse waters is particularly acute because of the large volumes involved.

In our application Serial No. 234,756, filed July 2, 1951, we disclosed a method for rapidly reducing to a low concentration the cyanide content of an aqueous solution of a cyanide. In practicing this method in accordance with our prior application, the cyanide solution was heated to a temperature of at least 190° F. We have since discovered that equally good results are obtained when practicing the above method with the cyanide solution at room temperature. This is of great importance when reducing the cyanide content of large volumes of cyanide rinse waters. The necessity for heating and special tanks is obviated. Thus, the cost of the operation is greatly reduced and the cyanide reducing method simplified.

While a number of treatments for reducing cyanide contents of solutions has been proposed in many instances, it has been found that these previously suggested treatments only partly reduce the cyanide content even after prolonged treatment. In many instances the treatment is relatively expensive. The hazards of handling and disposing of cyanide solutions are otherwise well known to those skilled in the art.

The process set forth in Wagner Patent 2,520,703 has been suggested for treating cyanide solutions but this process has been found to be slow and the time required to reduce the cyanide content of the usual aqueous solutions to a few parts per million requires many days' treatment. In carrying out the process of this patent, we have found it difficult to reduce the cyanide content of conventional cyanide rinses with 1 gram per liter of cyanide to a few parts per million even after prolonged treatment.

The object of this invention is to provide a process capable of rapidly reducing to a low concentration the cyanide content of large volumes of aqueous solutions containing a cyanide.

Another object of the invention is to provide apparatus by means of which aqueous solutions of a cyanide may be treated to reduce the cyanide content to a very low concentration in a brief period of time.

Other objects of the invention will in part be obvious and will in part appear hereinafter. For a better understanding of the nature and objects of the invention, reference should be had to the following detailed description and drawing, in which the sole figure is a cross section through an apparatus for treating aqueous solutions containing a cyanide.

In accordance with the present invention we have discovered that aqueous solutions of cyanides may be treated quickly in an electrolytic cell to reduce almost completely the cyanide content thereof by employing a porous inert anode, preferably of carbon or graphite, through which gaseous free oxygen is passed so that a stream of fine gas bubbles having free oxygen is present at the surface of the anodes simultaneously with the passage of electrical current through the anode. We have found that the oxygen is rendered highly reactive by this procedure. The combination of the activated oxygen at the anode surfaces results in a catalytic oxidation of the cyanide when current is applied at a suitable current density to the electrolytic cell, to be specified hereinafter, and this results in an unexpectedly high rate of conversion of cyanides to relatively non-toxic products.

Referring to the figure of the drawing, there is illustrated an electrolytic cell apparatus 10 comprising a tank 12 of wood, glass or other inert material within which is disposed the aqueous solution 14 containing cyanides to be destroyed or otherwise reduced. Air agitation may be used if deemed desirable but it is not necessary. In some cases, air agitation has even proved harmful. To provide air agitation a tube 16 having perforations 18 is placed along the bottom of the tank 12. Air under pressure introduced into the tube 16 escapes through the perforations 18 and causes agitation of the solution 14. Disposed in the solution 14 is a porous anode 20 comprising a body of carbon or graphite characterized by fine interstices or pores therethrough which will permit the passage of a gas. The anode 20 is provided with a hollow interior 22 with which a pipe 24 communicates for conveying air or other oxygenous gas thereto from an air compressor 26 or the like. Ordinary atmospheric air, which contains approximately 21% by volume of free oxygen, is a convenient source of oxygen to be passed through the porous anode. 20. If desired, pure oxygen may be passed through the anode 20 and the process of reducing the cyanides will be expedited proportionately. A positive terminal 28 conveys electrical current to the anode 20 from a suitable electrical direct-current source such, for example, as a direct-current generator 34 or a rectifier. The cathode comprises an inert member 30 in the form of a grid of nickel wire. A sheet of nickel, platinum, or other inert material may be used if desired for the cathode. A lead 32 connects the cathode with the negative terminal of the source of direct current 34.

In operation, the tank 12 is filled with the aqueous solution having a cyanide present therein. Ordinarily, these solutions will contain from about 0.1 to 2 grams per liter of cyanide ($CN^-$), both free and combined. It should be understood that the cyanide content may exceed these limits. The solution 14 may be at room temperature. The air compressor 26 is put into operation blowing air or oxygen into the hollow 22 of the anode 20 and the air escapes through the walls of the anode 20 in a stream of fine bubbles forming at the surface of the anode. Simultaneously, electrical current sufficient to provide a current density of at least 5 amperes per square foot of the surface of the anode is passed through the anode and the cathode. The combination of the free oxygen at the surface of the anode and the electrical current catalyzes a rapid reaction of the oxygen and cyanide to form relatively non-toxic gases, primarily carbon dioxide, carbon monoxide, and nitrogen. Air agitation of the solution may be employed during the process although we have found no outstanding difference in the rate of destruction of the cyanide when air is blown through the tube 16.

It should be understood that the construction of the anode 20 may be modified as long as fine bubbles of a free oxygen-containing gas are formed at the surface of the anode. Porous, sintered metal anodes of a metal, such as platinum, may be employed. The pores should be less than 0.1 inch in diameter. In our carbon anodes the pores or spaces are 0.02 inch and smaller in diameter. Solid or coarse wire screen anodes are not suitable in the practice of the invention.

We have secured particularly good results when the voltage between anode 20 and cathode 30 is of the order of 50 to 150 volts. Voltages up to 500 volts may be used with dilute cyanide rinse waters. An example of the current density in an installation that we found to be satisfactory was approximately 20 amperes per square foot at the anode. The distance separating the anode and cathode was approximately the standard value of 6 inches. As the distance separating them is increased and the conductivity of the solution decreases, higher voltages will be required.

Rinse waters, applied to members after being plated in a cyanide bath, ordinarily carry from 100 to 350 parts per million of cyanide ($CN^-$) at the time they must be discarded. The process of the present invention was applied to aqueous solution, corresponding to a typical rinse solution, containing 340 parts per mililon of cyanide ($CN^-$). Air was passed through the porous carbon anode at the rate of 1.0 cubic foot per hour per gallon of the aqueous solution being treated. The anode and cathode were approximately 6 inches apart. Electrical current at from 100 to 150 volts was passed between the anode and cathode, the current density being approximately 20 a. s. f. at the anode. The following results were obtained as the process was carried out at 190° F. to 212° F.

| Time | Concentration of $CN^-$, p. p. m. | Percent Reduction of Cyanide |
| --- | --- | --- |
| 0 | 340 | |
| ½ hr | 160 | 53 |
| 1 hr | 98 | 72 |
| 2 hrs | 1.4 | 99.6 |
| 4 hrs | 0.4 | 99.9 |

Other batches of rinse water containing 340 parts per million of cyanide were similarly treated, with the rinse water being initially at room temperature. There was a rise in temperature due to the current flow. Substantially the same reduction was obtained, i. e. a 99.9% reduction, in 4 hours under these conditions as obtained in the preceding example.

Further examples, illustrative of the practice of the invention are the following: an aqueous cyanide plating solution containing one gram per liter of sodium cyanide was treated by immersing therein a porous carbon anode and a nickel wire cathode six inches apart. The solution was at a temperature of from 190° F. to 212° F. during the process. A current of 20 amperes per square foot at the anode was maintained throughout a period of 6 hours, the voltage required increasing from 100 volts at the beginning of the experiment to 150 at the end of the experiment. During this treatment air was blown through the porous carbon anode in the amount of approximately 1.0 cubic feet per hour per gallon of solution. At the end of 6 hours the concentration of cyanide was 2.5 parts per million of the solution. This represents a reduction of the order of 99.99%. The solution at the end of the treatment could be safely discarded into a sewer system without danger of any toxic effects.

In contrast with the success of the present process, a similar solution was treated in accordance with Patent 2,520,703 using an iron anode and a nickel wire cathode with temperatures of from 190 to 212° F. being maintained during the operation. Direct current at 13 volts was passed between the anode and cathode in this process. At the end of 6 hours, the solution still contained 1.3 grams per liter of cyanide, and the cyanides had been only reduced 33%. Our experience has been that the rate of reduction of cyanides with the process disclosed in this patent diminishes with the concentration so that less and less of the cyanide is reduced per hour as the concentration of cyanide in the solution is reduced.

The process of the present invention is extremely effective in treating dilute solutions. We have found it advantageous in treating rinse waters employed to rinse parts plated in cyanide plating solutions. Rinse water containing a small amount of cyanide per gallon may be treated while at room temperature in only one or two hours to reduce the cyanide content to a few parts per million.

The platable metallic components in the electrolyte will plate out on the cathode and may be recovered if desired. Other inert materials may be used for the cathode besides nickel.

It should be understood that the description and drawing are illustrative of the invention and not in limitation thereof.

We claim as our invention:

1. In the process of rapidly reducing to a low concentration the cyanide content of an aqueous solution of a cyanide, the steps comprising disposing in the aqueous solution an inert cathode and an insoluble anode having porous walls, passing through the walls of the porous anode a gas containing free oxygen, the gas forming a stream of fine bubbles at the surface of the anode, and, simultaneously with the passage of the gas through the walls of the anode, passing a direct electrical current at a density of at least 5 amperes per square foot at the anode, the amount of the gas being sufficient to provide oxygen in an amount in substantial excess of that required to react with the cyanide to form relatively non-toxic products comprising essentially carbon dioxide, carbon monoxide, and nitrogen.

2. The process of claim 1, wherein the anode comprises porous carbon.

3. The process of claim 1, wherein the voltage applied to the anode and cathode is from about 50 to 150 volts.

4. The process of claim 1, wherein the aqueous solution is at room temperature.

References Cited in the file of this patent

UNITED STATES PATENTS

| 2,273,036 | Heise et al. | Feb. 17, 1942 |
| 2,520,703 | Wagner | Aug. 29, 1950 |

OTHER REFERENCES

"Plating," vol. 36, No. 4, April 1949, pp. 343 to 347 of article by Sperry et al.

Industrial Wastes, Rudolfs (1953), pub. by Reinhold Publ. Corp., N. Y. C., pp. 299–301.